United States Patent
Lee et al.

(10) Patent No.: US 9,078,194 B2
(45) Date of Patent: Jul. 7, 2015

(54) METHOD AND DEVICE FOR TRANSMITTING/RECEIVING DATA IN WIRELESS ACCESS SYSTEM SUPPORTING MULTI-RADIO ACCESS TECHNOLOGY

(75) Inventors: Eunjong Lee, Anyang-si (KR);
Heejeong Cho, Anyang-si (KR);
Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 10 days.

(21) Appl. No.: 13/811,662

(22) PCT Filed: Jul. 22, 2011

(86) PCT No.: PCT/KR2011/005447
§ 371 (c)(1),
(2), (4) Date: Jan. 22, 2013

(87) PCT Pub. No.: WO2012/011787
PCT Pub. Date: Jan. 26, 2012

(65) Prior Publication Data
US 2013/0122904 A1    May 16, 2013

Related U.S. Application Data

(60) Provisional application No. 61/366,896, filed on Jul. 22, 2010, provisional application No. 61/368,240, filed on Jul. 27, 2010.

(51) Int. Cl.
*H04W 88/10* (2009.01)
*H04W 48/10* (2009.01)
(Continued)

(52) U.S. Cl.
CPC .............. *H04W 48/10* (2013.01); *H04W 48/18* (2013.01); *H04W 76/025* (2013.01); *H04W 88/06* (2013.01); *H04W 76/026* (2013.01)

(58) Field of Classification Search
CPC ...... H04W 48/18; H04W 36/00; H04W 48/10
USPC ................... 455/436–444, 435.1, 435.2, 434; 370/331, 332
See application file for complete search history.

(56) References Cited

U.S. PATENT DOCUMENTS 8,291,625 B2 * 10/2012 Lee et al. .......................... 37/331
8,457,070 B2 * 6/2013 Park et al. ...................... 370/331
(Continued)

FOREIGN PATENT DOCUMENTS

WO    2009/005524    1/2009

OTHER PUBLICATIONS

Kim, et al., "Contribution for Hierarchical Network Study Report," IEEE 802.16 Broadband Wireless Access Working Group, IEEE C802.16ppc-10/0044, Jul. 2010, 9 pages.
(Continued)

*Primary Examiner* — Kashif Siddiqui
*Assistant Examiner* — Farideh Madani
(74) *Attorney, Agent, or Firm* — Lee, Hong, Degerman, Kang & Waimey

(57) ABSTRACT

The present invention relates to a method by which a terminal transmits/receives data to/from a first base station (BS) supporting a first radio access technology (RAT) and a second BS supporting a second RAT in a wireless access system supporting multi-RAT, the method comprising the steps of: executing an initial network entry to the first BS; a step for executing a multi-RAT capability negotiation with the first BS to exchange information needed to access the second BS; executing a scanning on at least one second BS included in the coverage of the first BS, on the basis of the information received from the first BS through the multi-RAT capability negotiation process; executing an access to a second BS of the at least one second BS; and simultaneously transmitting/receiving data with the first BS and the second BS accessed through the access process.

10 Claims, 5 Drawing Sheets

(51) Int. Cl.
*H04W 76/02* (2009.01)
*H04W 48/18* (2009.01)
*H04W 88/06* (2009.01)

(56) References Cited

U.S. PATENT DOCUMENTS

2007/0183383 A1   8/2007   Bitran et al.
2009/0180451 A1   7/2009   Alpert et al.
2010/0111214 A1   5/2010   Chin et al.
2011/0014919 A1*  1/2011   Otte et al. .................... 455/442

OTHER PUBLICATIONS

Kim, et al., "Study Report on Hierarchical Networks (Working document)," IEEE 802.16 Broadband Wireless Access Working Group, IEEE 802.16ppc-10/0008, Jul. 2010, 14 pages.

PCT International Application No. PCT/KR2011/005447, Written Opinion of the International Searching Authority dated Feb. 6, 2012, 14 pages.

Korean Intellectual Property Office Application Serial No. 10-2013-7002952, Notice of Allowance dated Mar. 25, 2014, 2 pages.

* cited by examiner

METHOD AND DEVICE FOR TRANSMITTING/RECEIVING DATA IN WIRELESS ACCESS SYSTEM SUPPORTING MULTI-RADIO ACCESS TECHNOLOGY

CROSS-REFERENCE TO RELATED APPLICATIONS

This application is the National Stage filing under 35 U.S.C. 371 of International Application No. PCT/KR2011/005447, filed on Jul. 22, 2011, which claims the benefit of U.S. Provisional Application Ser. No. 61/366,896, filed on Jul. 22, 2010, and U.S. Provisional Application Ser. No. 61/368,240, filed on Jul. 27, 2010, the contents of which are all hereby incorporated by reference herein in their entirety.

TECHNICAL FIELD

The present specification relates to a wireless access system supportive of a multi-radio access technology (RAT), and more particularly, to a method of transmitting/receiving data via two or more heterogeneous networks and apparatus therefor.

BACKGROUND ART

In a conventional wireless communication system supportive of two or more heterogeneous networks, although a mobile station has a capability of accessing a multi-radio access technology (RAT), the mobile station is not able to simultaneously transceive data with the two or more heterogeneous network by accessing the multi radio access technology at the same time.

In particular, in case of a mobile station supportive of a conventional multi-radio access technology, the mobile station becomes available to transceive data via a single network in a manner of accessing a radio access technology based on a switching. Hence, a mobile station capable of accessing a multi-RAT transceives data via a specific network. In case that the mobile station tranceives data with a network different from the specific network, data transmission/reception to/from one of the networks becomes suspended.

Therefore, although a mobile station capable of supporting two or more heterogeneous networks is able to perform a communication using networks different from each other in a related art, there exists a limit in terms of efficiency since it simply operates based on a switching.

Moreover, since the networks different from each other perform independent operations, respectively, inefficient management is performed in aspect of managing overall flow of a mobile station.

DISCLOSURE OF THE INVENTION

Technical Tasks

An object of the present specification is to define an overall process for a mobile station having a multi-RAT capability to simultaneously transmit/receive data via two or more heterogeneous networks, i.e., each of networks.

Another object of the present specification is to define a multi-RAT capability negotiation process between a mobile station having a multi-RAT capability and a base station indicating an overall control operation to simultaneously transmit/receive data via two or more networks.

Technical Solution

To achieve these and other advantages and in accordance with the purpose of the present invention, as embodied and broadly described, a method of transmitting/receiving data, which is transceived by a mobile station with a first base station supportive of a $1^{st}$ radio access technology and a second base station supportive of a $2^{nd}$ radio access technology, in a radio access system supportive of a multi-radio access technology (RAT) includes the steps of performing an initial network entry process with the first base station, performing an multi-RAT capability negotiation process with the first base station to exchange an information necessary for an access to the second base station, performing a scanning procedure on at least one second base station included in a coverage of the first base station based on the information received from the first base station by the multi-RAT capability negotiation process, performing an access procedure with a second base station of the at least one second base station, and transceiving the data simultaneously with the first base station and the second base station accessed by the access procedure.

Preferably, an indicator indicating the mobile station having a multi-RAT capability is transmitted to the first base station via the initial network entry process.

More preferably, the indicator is transmitted to the first base station via a registration request (REG-REQ) message.

More preferably, the indicator is a multi-RAT mobile station capability field and a size of the multi-RAT mobile station capability field is 1-bit long.

Preferably, the method further includes the step of receiving an information informing the multi-RAT capability negotiation process is performed after a completion of the initial network entry process from the first base station.

Preferably, the multi-RAT capability negotiation process performing step includes the steps of receiving an information on the second base station existed in the coverage of the first base station from the first base station, sending a multi-RAT capability request message including the information related to the second base station supportive $2^{nd}$ radio access technology based on the received information on the second base station to the first base station, and receiving a multi-RAT capability response message in response to the multi-RAT capability request message from the first base station.

More preferably, the multi-RAT capability request message includes at least one of 802.11 MAC address of the mobile station, a previously accessed AP information, and a protocol version information of 802.11.

More preferably, the multi-RAT capability response message includes an information on a candidate second base station accessible by the mobile station.

Preferably, the $1^{st}$ radio access technology is a wideband radio access technology and the $2^{nd}$ radio access technology is a short-range radio access technology.

More preferably, the wideband radio access technology is 802.16 supportive radio access technology and the short-range radio access technology is 802.11 supportive radio access technology.

Preferably, the first base station and the second base station are connected with each other by wired or wireless.

Preferably, a type of data flow transceived via the second base station is determined by an indication of the first base station.

To further achieve these and other advantages and in accordance with the purpose of the present invention, a mobile station, which transceives data with a first base station supportive of a $1^{st}$ radio access technology and a second base station supportive of a $2^{nd}$ radio access technology in a radio access system supportive of a multi-radio access technology (RAT) includes a wireless communication unit configured to externally transmit/receive a wireless signal and a control unit connected to the wireless communication unit controlling the wireless communication unit to perform an initial network entry process with the first base station, the control unit controlling the wireless communication unit to perform an multi-RAT capability negotiation process with the first base station to exchange an information necessary for an access to the second base station, the control unit controlling the wireless communication unit to perform a scanning procedure for at least one second base station included in a coverage of the first base station based on the information received from the first base station via the multi-RAT capability negotiation process, the control unit controlling the wireless communication unit to receive a second system access command message indicating the access to a second base station of the at least one second base station from the first base station, the control unit controlling the wireless communication unit to simultaneously transceive data with the first base station and the second base station in a manner of accessing the second base station based on the received second system access command message.

Advantageous Effects

According to the present specification, a multi-RAT mobile station is able to simultaneously transceive data with each of networks via two or more heterogeneous networks, thereby reducing an overhead resulted from a data transmission/reception in a specific network.

According to the present specification, a mobile station transmits that the mobile station has a multi-RAT capability to a base station via an initial network entry process, thereby enabling the base station to easily discriminate the corresponding mobile station having the multi-RAT capability.

According to the present specification, a multi-RAT capability negotiation process is performed between a multi-RAT mobile station and a base station of a first system, thereby enabling the first system to indicate the multi-RAT mobile station to efficiently use a second system appropriate for a capability of the multi-RAT mobile station.

BEST MODE

Mode for Invention

Figure 1A:
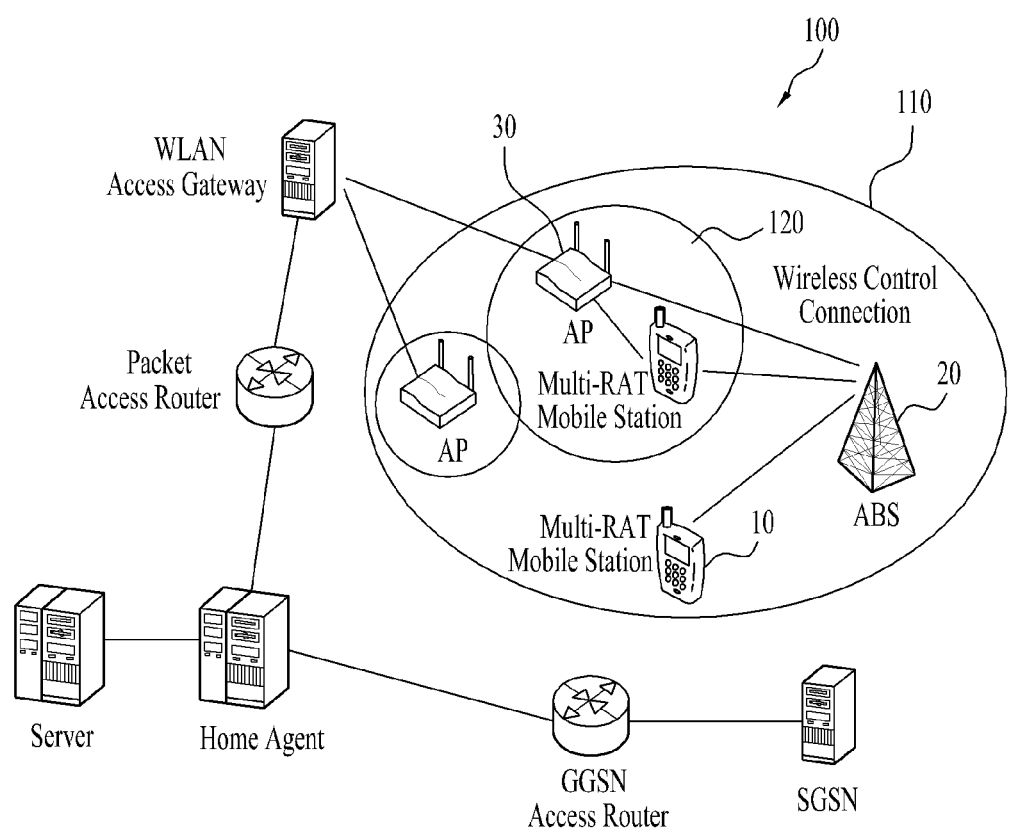
FIG. 1A and FIG. 1B are conceptual diagrams for explaining a multi-radio access technology (multi-RAT), to which one embodiment of the present specification can be applied.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like.

CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. IEEE 802.16m is an evolved version of IEEE 802.16e and may provide a backward compatibility to a system based on IEEE. 802.16e.

UTRA is a part of UMTS (Universal Mobile Telecommunications System).

3GPP ($3^{rd}$ Generation Partnership Project) LTE (long term evolution) is a part of E-UMTS (Evolved UMTS) that uses E-UTRA (Evolved-UMTS terrestrial radio access). The 3GPP LTE adopts OFDMA in downlink and SC-FDMA in uplink. And, LTE-A (LTE-Advanced) is an evolved version of 3GPP LTE.

In the following description, a preferable embodiment according to the present invention is explained in detail with reference to the attached drawings. The same reference numbers will be used throughout the drawings to refer to the same or like parts in this specification irrespective of the sign of the drawings and the overlapped explanation on the corresponding content can be omitted. And, in describing the present invention, if the detailed description of the related art is determined as making the point of the present invention unclear, it will be omitted. The accompanying drawings, which are included to provide a further understanding of the invention and are incorporated in and constitute a part of this specification, illustrate embodiments of the invention and together with the description serve to explain the principles of the invention only. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

In the following description, a method for a mobile station to simultaneously transceive data via each of networks in a manner of accessing two or more heterogeneous networks (or multi RATs) in a multi-RAT network proposed by the present specification is explained.

First of all, a multi radio access technology (RAT) network proposed by the present specification is explained.

Figure 1B:
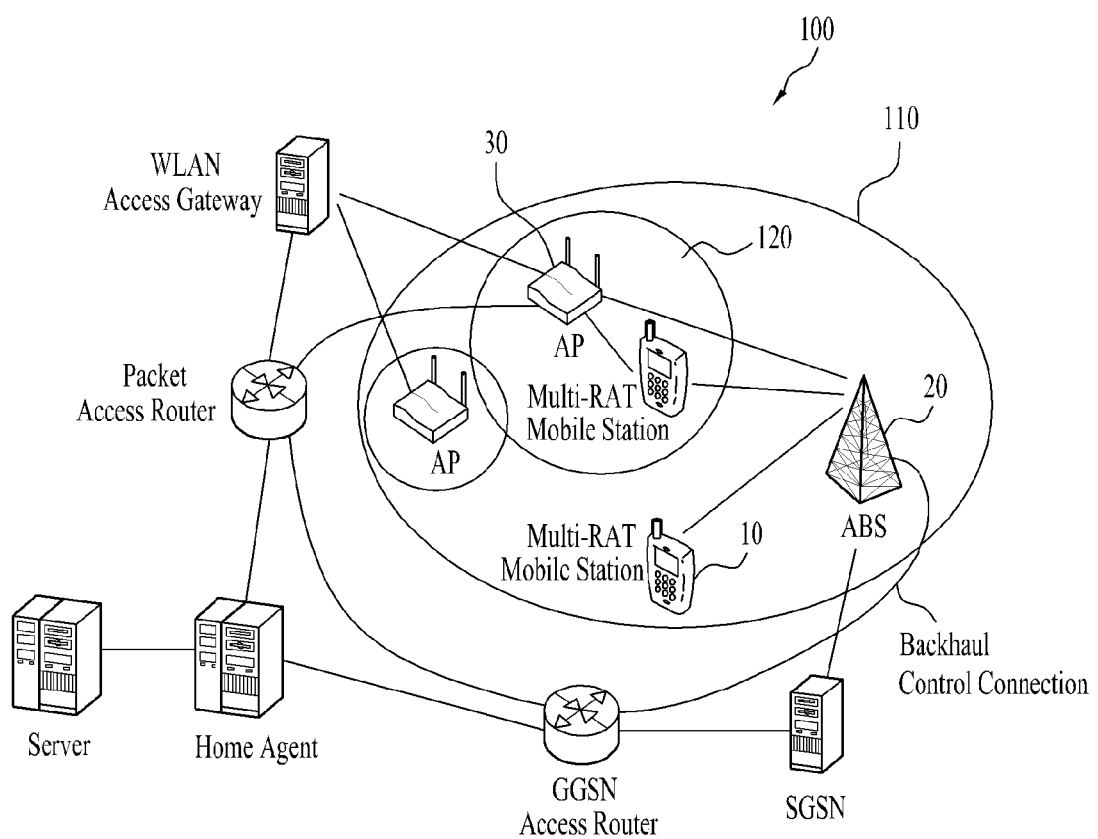

FIG. 1A and FIG. 1B are conceptual diagrams for explaining a multi-radio access technology (multi-RAT), to which one embodiment of the present specification can be applied.

The multi-radio access technology (hereinafter abbreviated multi-RAT) network may indicate a radio communication environment having two or more hetero generous networks and capable of performing a simultaneous communication in a manner of accessing the two or more heterogeneous networks by a mobile station.

In this case, the mobile station capable of performing a simultaneous communication with the two or more heterogeneous networks is called a multi-RAT mobile station or a multi system mobile station.

A heterogeneous network (or heterogeneous system) means a network that uses a communication scheme different from the communication scheme used by a specific network with reference to the specific network.

For instance, WiMAX network, which is one example for a mobile communication system, and WiFi network using WiFi network correspond to a heterogeneous network with each other.

A RAT is a type of technology used in a wireless access. For instance, the RAT may include GERAN (GSM/EDGE radio access network), UTRAN (UMTS terrestrial radio access network), E-UTRAN (evolved-UMTS), WiMAX, LTE (LTE-advanced), WiFi, etc. In particular, GERAN, UTRAN, E-UTRAN, WiMAX and/or WiFi exist in a manner of being mixed in a same region.

As shown in FIG. 1, a multi-RAT network 100 may be configured by including a first system (a primary system 110) and a second system (a second system 120).

In this case, the first system 110 and the second system 120 can be represented as a $1^{st}$ network and a $2^{nd}$ network, respectively. The first system 110 may include a multi-RAT mobile station 10, a base station 20, and the second system 120. The second system 120 may include a multi-RAT mobile station 10 and an AP 30.

The first system is a system having a wide range of coverage and may be a mobile communication system. For instance, the first system may be a WiMAX or a LTE (LTE-A) system. And, the first system is a system always having a status with the multi-RAT mobile station. In particular, the first system is a system that maintains an active state or a sleep/idle mode state with the multi-RAT mobile station.

The second system is a system having a small range of coverage and may be a short-range communication system (WLAN). For instance, the second system may be a WiFi system. In particular, the second system is a system that can be added or deleted to/from a multi-RAT network if necessary. And, the second system may be used mainly for transmitting/receiving data requiring a higher bandwidth. Hence, a specific flow (QoS) can be mapped for the use of the second system.

In this case, an access point, which is one example of the second system, may be able to operate equally to a mobile station capable of communicating with the first system.

And, the first system and the second system are connected to each other by wired or wireless in a multi-RAT network. In particular, a base station of the first system and a base station of the second system may be connected to each other by wired via a backbone network (FIG. 1B) or may be connected to each other by wireless (FIG. 1A).

In the following description, for clarity of explanation, assume that the first system is WiMAX system and the second system is WiFi system unless there is a specific mention. Therefore, it will be represented that a base station corresponding to the first system is a 'base station' and a base station corresponding to the second system is 'AP'. And, an access to the first system may correspond to the access to the base station and an access to the second system may correspond to the access to the AP.

Figure 2:
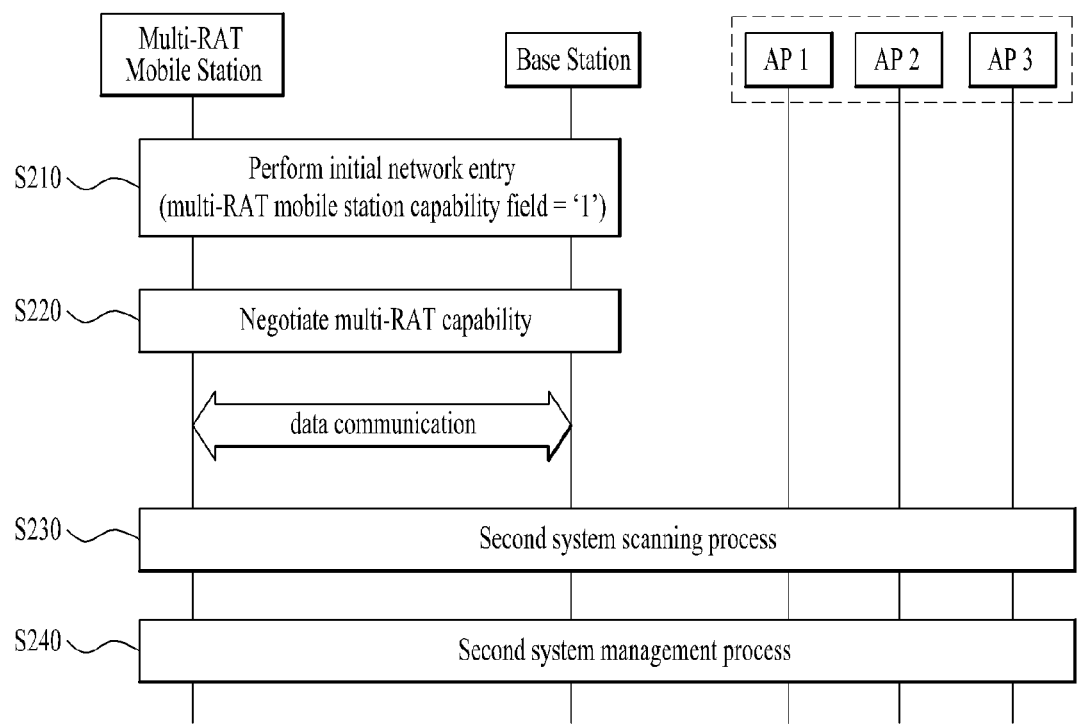
FIG. 2 is a flowchart for explaining a method for a multi-RAT mobile station to transceive data via a first system and a second system according to one embodiment of the present specification.

FIG. 2 is a flowchart for explaining a method for a multi-RAT mobile station to transceive data via a first system and a second system according to one embodiment of the present specification.

Referring to FIG. 2, the multi-RAT mobile station performs an initial network entry process with a base station [S210].

A multi-RAT mobile station transmits an indicator indicating that the multi-RAT mobile station is a mobile station supportive of a multi-RAT to a base station via an initial entry process performed with the base station. In this case, the indicator may be a multi-RAT mobile station capability field. And, the indicator, i.e., the multi-RAT mobile station capability field may be 1-bit long.

And, the indicator may be transmitted by a registration process performed with the base station during the initial network entry process. In this case, the indicator may be transmitted to the base station by a registration request or a registration response message (REG-REQ/RSP message).

For instance, if the indicator is set to '1', it indicates a mobile station supportive of a multi-RAT. If the indicator is set to '0', it indicates a mobile station not supportive of a multi-RAT.

And, if the base station receives a registration request or a registration response message including an indicator (e.g., set to '1') indicating that a multi-RAT mobile station has a capability of supporting a multi-RAT from the multi-RAT mobile station, the base station may transmit the multi-RAT mobile station an information informing that a separate multi-RAT capability negotiation process for supporting the multi-RAT mobile station will be performed after the completion of the initial network entry process or a prescribed time period.

For instance, if the information is set to '1', the base station and the multi-RAT mobile station indicate that a separate capability negotiation process is performed to support the multi-RAT, if the information is set to '0', the base station and the multi-RAT mobile station indicate that a separate capability negotiation process is not necessary to be performed.

In case that the multi-RAT mobile station finished the initial network entry process with the base station, the multi-RAT mobile station and the base station perform the multi-RAT capability negotiation process [S220]. In this case, the multi-RAT capability negotiation process is performed after the completion of the network (re)entry process in general. Yet, it may also be performed in the middle of the network (re)entry process with the base station.

For instance, if the multi-RAT capability negotiation process is performed in the middle of the network (re)entry process, the multi-RAT mobile station and the base station may be able to perform the multi-RAT capability negotiation process via a registration procedure of the multi-RAT mobile station and the base station. In doing so, the multi-RAT mobile station and the base station transceive an information on the multi-RAT capability negotiation via a registration request/response (REG-REQ/REG-RSP) message.

The multi-RAT capability negotiation process between the multi-RAT mobile station and the first system shall be explained in detail with reference to FIG. 3 as follows.

Thereafter, the multi-RAT mobile station performs an AP scanning process to access the second system based on the second system related information received from the base station [S230].

In this case, the multi-RAT mobile station performs a scanning process for a nearby AP periodically or in a manner of event-triggered to access the second system.

First of all, a connection for all data transmitted to the multi-RAT mobile station is established through a dynamic service procedure (DSx procedure) of the first system performed with the base station. Assume a communication between the multi-RAT mobile station and the second system is to transmit data for a specific flow to the second system under the judgment of the base station of the first system.

And, assume a scanning of the multi-RAT mobile station for an AP of the second system is performed under an instruction of the base station of the first system. The reason for this is for a power saving of the multi-RAT mobile station.

The AP scanning process for the multi-RAT mobile station to access the second system may include the processes of receiving a multi-RAT scan command message from the base station, performing a scan based on the received multi-RAT scan command message, and sending the base station a multi-RAT scan report message to report a scanned result.

Thereafter, the multi-RAT mobile station performs a management (or an operation) procedure with the second system [S240]. In this case, the management procedure with the second system may indicate such a process as a connection with the second system, a cancellation of the connection with the second system, a connection change with the second system and the like of the multi-RAT mobile station. In this case, the management procedure of the second system is controlled by the first system.

Having performed an access procedure with the second system, the multi-RAT mobile station transceives data via an AP of the second system.

In this case, in order for the multi-RAT mobile station to access the second system, the multi-RAT mobile station should receive a confirmation response for the access to the second system from the first system.

As mentioned in the foregoing description, the base station selects an AP for the multi-RAT mobile station to access before transmitting the multi-RAT mobile station the confirmation response for the access of the multi-RAT mobile station to the second system and then checks the status of the selected AP. Having checked the status of the AP, if it is feasible to access the selected AP, the base station may be able to transmit an information on the multi-RAT mobile station to the selected AP in advance.

And, in case that the base station transmits the confirmation response to the multi-RAT mobile station, necessary or useful information for the multi-RAT mobile station to access the AP may be transmitted together with the confirmation response.

For instance, the necessary or useful information may include a SSID, a protocol version of the AP (11a/b/n . . . ), offset information between beacon and a frame of the base station, i.e., transmitting a relative position of the beacon by representing the difference with a specific frame time, and the like.

Having performed the AP scanning for the access to the second system, if the multi-RAT mobile station recognizes that the multi-RAT mobile station entered a coverage of the second system, the multi-RAT mobile station may make a request for an access to the second system to the base station of the first system.

Messages necessary for the management process of the second system may include as follows.

1. second system request (SS_REQ) message
: message used for the multi-RAT mobile station to make a request for an access to an AP.

2. second system command (SS_CMD) message
: message used for managing the access with the AP, used for a connection with the AP, a cancellation of the connection with the AP, the connection change with the AP, and the like.

3. second system indication (SS_IND) message
: message used in response to the second system command message, used for informing the base station of a success of connection with the AP, a success of a cancellation of the connection with the AP, a success of the connection change with the AP.

Thereafter, in case that the multi-RAT succeeded in accessing the AP of the second system, the multi-RAT mobile station may be able to simultaneously transceive data with the first system and the second system. In this case, the data transceived with the multi-RAT mobile station via the AP is controlled by the first system.

Multi-RAT Capability Negotiation Process

In the following description, a multi-RAT capability negotiation process between a multi-RAT mobile station and a base station is explained in detail.

Figure 3:
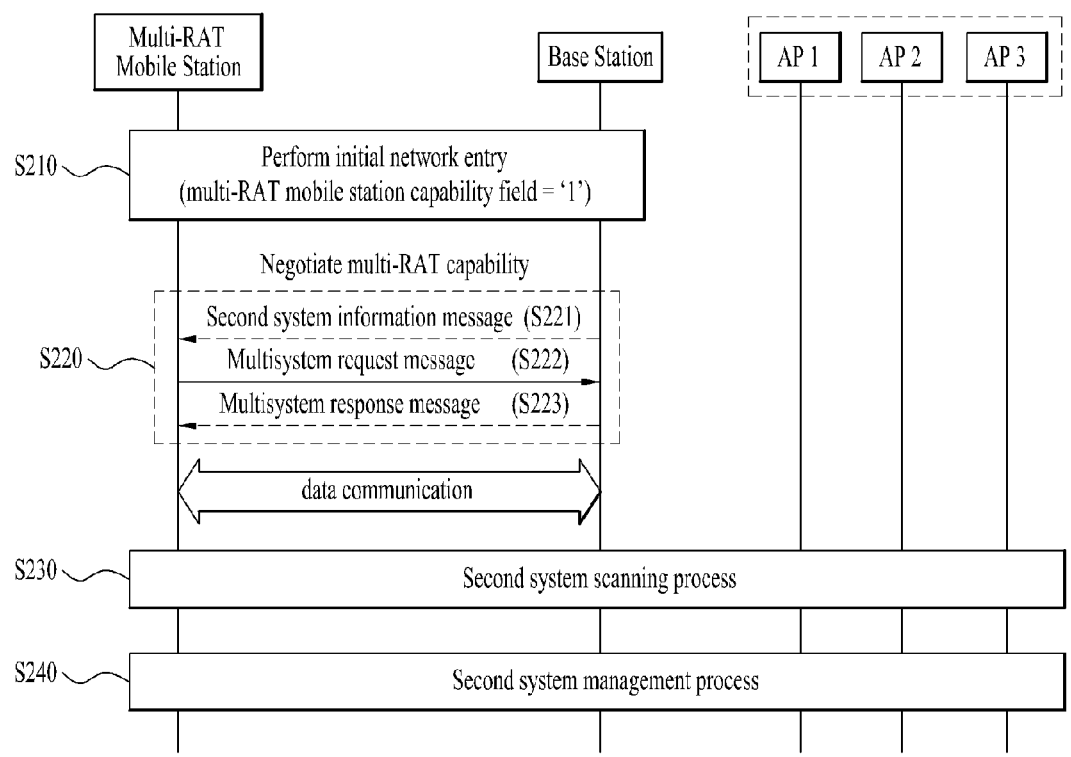
FIG. 3 is a flowchart for explaining a multi-RAT capability negotiation process between a multi-RAT mobile station and a first system according to one embodiment of the present specification.

FIG. 3 is a flowchart for explaining a multi-RAT capability negotiation process between a multi-RAT mobile station and a first system according to one embodiment of the present specification.

Since S210, S230 to S240 are same with the contents of FIG. 2, the explanation for the steps are omitted. The step of S220 having a difference is explained in detail.

As mentioned in the above description, the multi-RAT capability negotiation process between a multi-RAT mobile station and a base station is performed after a network (re) entry.

In case of a network re-entry, the multi-RAT capability negotiation process can be omitted. Since the multi-RAT capability negotiation process has already been performed via an initial network entry process between the multi-RAT mobile station and the base station, performing a same procedure, which performed already, again when the multi-RAT mobile station performs a network re-entry into an identical system, it may occur an unnecessary overhead.

And, in case of a handover (HO), a target base station of the first system may be able to perform the multi-RAT capability negotiation process with the multi-RAT mobile station in advance from a serving base station of the first system via a backbone network.

The multi-RAT capability negotiation process performed by the multi-RAT mobile station with the first system as follows.

First of all, the base station may be able to transmit the second system related information to the multi-RAT mobile station [S221]. In particular, if there exist a common information on APs of the second system of which the multi-RAT mobile station should receive, the base station may be able to transmit the information on APs to the multi-RAT mobile station in a manner of broadcast or unicast.

In this case, the second system related information may mean an information on a heterogeneous system, which belongs to a same coverage with the first system. The multi-RAT mobile station may not necessarily know the information on all of the second systems included in the first system and the second system related information. In this case, the base station does not transmit the information on all of the second systems and the second system related information and may be then able to transmit a list of information related (or necessary) to the multi-RAT mobile station only to the multi-RAT mobile station in a manner of unicast. In doing so, the list may be transmitted in the middle of the multi-RAT capability negotiation process.

Thereafter, the multi-RAT mobile station sends a multisystem capability request message to the base station [S222]. The multisystem capability request message may include 802.11 MAC address of a mobile station, an information on a previously accessed AP, a protocol version information of 802.11 and the like. The 802.11 MAC address is necessary for an authentication information. In case that the previously accessed AP information is included in the multisystem capability request message, the multisystem capability request message is transmitted to the base station to which the previously accessed AP belongs only.

Thereafter, the base station sends a multisystem capability response message to the multi-RAT mobile station in response to the multisystem capability request message [S223].

The multisystem capability response message may include an information on candidate APs.

In case that the multi-RAT mobile station entered an idle mode, the base station may be able to store the information obtained via the multi-RAT capability negotiation process with the multi-RAT mobile station for a prescribed time. In particular, the base station stores the obtained information until the base station newly defines a multi-RAT information maintenance timer and the multi-RAT information maintenance timer is expired. The base station may be able to discard the obtained information after the timer is expired.

Therefore, in case that the multi-RAT mobile station performs a network re-entry to the base station before the multi-RAT information maintenance timer is expired, the multi-RAT capability negotiation process may be omitted.

The embodiments and modified examples thereof mentioned in the foregoing description can be combined with one another. The embodiments can be implemented in a manner of being combined with one another rather than separately implemented if necessary. Since such combination can be easily implemented by those skilled in the art, its details shall not be further described. Yet, even if the combinations are not described, they shall not be excluded from the present invention and should be construed as coming within the scope of the appended claims and their equivalents.

Embodiments and the modified examples of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various well-known means.

For instance, a method according to the present invention can be stored in a storing device (e.g., a built-in memory, a flash memory, a hard disk, etc.) and can be implemented into codes and/or commands in a software program implementable by a processor (e.g., microprocessor). This is explained with reference to FIG. 4.

Figure 4:
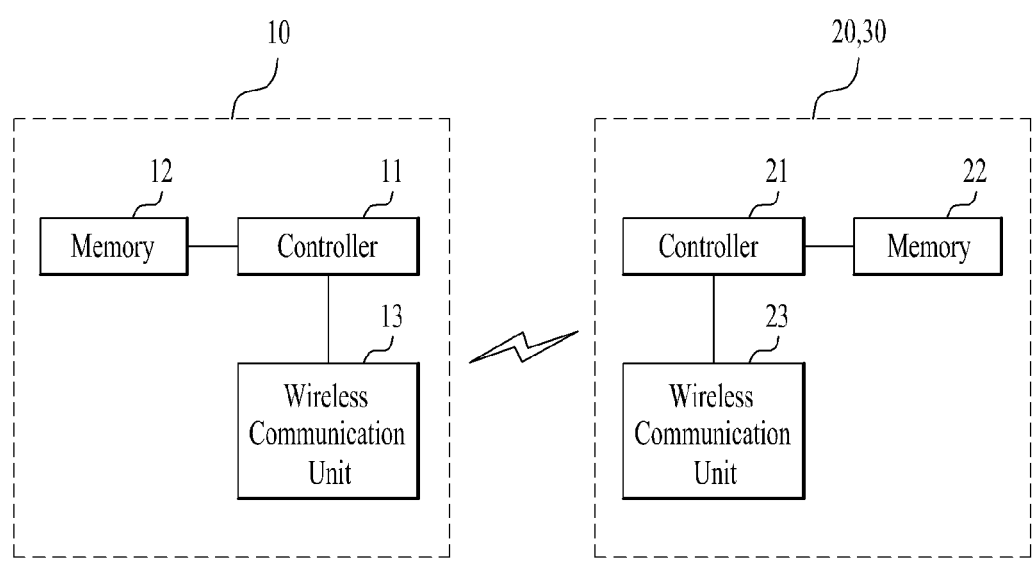
FIG. 4 is an internal block diagram of a mobile station and a base station in a wireless access system, to which one embodiment of the present specification can be applied.

FIG. 4 is an internal block diagram of a mobile station and a base station in a wireless access system, to which one embodiment of the present specification can be applied.

Referring to FIG. 4, a mobile station 10 may include a control unit 11, a memory 12, and a RF (radio communication) unit 13.

A mobile station 10 may be fixed or may have mobility. The mobile station can be called such a different terminology as a user equipment (UE), a user terminal (UT), a subscriber station (SS), a wireless device, an advanced mobile station (AMS) and the like. And, the mobile station may include the multi-RAT mobile station.

And, the mobile station may include a display unit, a user interface unit and the like.

A control unit 11 implements the proposed functions, processes and/or methods. Layers of a radio interface protocol can be implemented by the control unit 11.

A memory unit 12 is connected with a control unit 11 and then stores a protocol for performing a radio communication or a parameter. In particular, the memory unit stores a UE operation system, an application, and a general file. A Wireless communication unit 13 is connected with the control unit 11 and then transmits and/or receives a radio signal.

Additionally, the display unit displays various kinds of information of a mobile station and can use such a well-known component as an LCD (liquid crystal display), an OLED (organic light emitting diode) and the like. A user interface unit can be configured in a manner of being combined with such a well-known user interface as a keypad, a touchscreen and the like.

The base station 20/30 may include a control unit 21, a memory 22, and a RF (radio communication) unit 23.

The base station means a fixed station communicating with a mobile station in general and may be substituted with such a terminology as a Node B, a base transceiver system (BTS), an access point (AP) and the like. One base station contains at least one cell.

The control unit 21 implements the proposed functions, processes and/or methods. Layers of a radio interface protocol can be implemented by the control unit 21.

The memory 22 is connected with the control unit 21 and then stores a protocol for performing a radio communication or a parameter.

A Wireless communication unit 23 is connected with a control unit 21 and then transmits and/or receives a radio signal.

The control unit 11/21 may include ASIC (application-specific integrated circuit), a different chip set, a logical circuit and/or a data processing device. The memory 12/22 may include ROM (read-only memory), RAM (random access memory), a flash memory, a memory card, a storing media and/or a different storing device. The Wireless communication unit 13/23 may include a base band circuit for processing a radio signal. The aforementioned scheme can be implemented by a module (process, function and the like) performing the above mentioned function when embodiments are implemented by software. The module is stored in the memory 12/22 and may be implemented by the control unit 11/21.

The memory 12/22 may be built-in or outside the control unit 11/21. And, the memory 202/212 may be connected with the control unit 11/21 via various kinds of well-known means.

The technical terminologies used in the present specification are used only to describe a specific embodiment(s) and have no intention to restrict the present invention. The technical terminologies used in the present specification should be construed not as excessively inclusive meanings or excessively reduced meanings but as meanings generally understood by those having ordinary skill in the technical field, to which the present invention pertains, unless defined as other meanings especially in the present specification. If the technical terminologies used in the present specification fail in correctly representing the idea of the present invention, they should be substituted with technical terminologies correctly understandably by those having ordinary skill in the technical field to which the present invention pertains. Moreover, general terminologies used by the present invention may be construed not as the excessively reduced meanings but as the meanings defined in dictionaries or the sequence of the context.

And, the singular number representation used in the present specification may include the plural number representation unless mentioned clearly and differently in context. In the present application, such a terminology as 'configured', 'include' and the like should be construed not as necessarily including various components or steps written in the present specification but as including the components or steps in part or further including additional components or steps.

Moreover, a terminology, each of which includes such an ordinal number as $1^{st}$, $2^{nd}$ and the like, may be used to describe various components. In doing so, the various components should be non-limited by the corresponding terminologies, respectively. The terminologies are only used for the purpose of discriminating one component from other components. For instance, a $1^{st}$ component may be named a $2^{nd}$ component while coming within the scope of the appended claims and their equivalents. Similarly, the $2^{nd}$ component may be named the $1^{st}$ component.

In case that one component is mentioned as 'connected to' or 'accessing' another component, it may be connected to or access the corresponding component in direct. Yet, new component(s) may exist in between. On the other hand, in case that one component is mentioned as 'directly connected to' or 'directly accessing' another component, it should be understood that new component(s) may not exist in between.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

What is claimed is:

1. A method of transmitting/receiving data by a mobile station with a first base station supporting a $1^{st}$ radio access technology and a second base station supporting a $2^{nd}$ radio access technology, in a radio access system supporting a multi-radio access technology (RAT), comprising:
    transmitting an indicator indicating the mobile station having a multi-RAT capability during network entry process with the first base station;
    if the indicator is received by the first base station, receiving, from the first base station, an information notifying that a multi-RAT capability negotiation process is performed after a completion of the network entry process;
    if the network entry process is an initial entry process to the first base station,
    performing a multi-RAT capability negotiation process with the first base station to exchange an information necessary for an additional access to the second base station;
    performing a scanning procedure on at least one second base station included in a coverage of the first base station based on the exchanged information received from the first base station by the multi-RAT capability negotiation process;
    performing an additional access procedure with a second base station of the at least one second base station; and
    transceiving the data simultaneously with the first base station and the second base station accessed by the additional access procedure,
    wherein if the network entry process is an re-entry process to the first base station prior to expiration of a predetermined timer, the multi-RAT capability negotiation process is omitted and the exchanged information is used for the re-entry process.

2. The method of claim 1, wherein the indicator is transmitted to the first base station via a registration request (REG-REQ) message.

3. The method of claim 1, wherein the indicator comprises a multi-RAT mobile station capability field and wherein a size of the multi-RAT mobile station capability field is 1-bit long.

4. The method of claim 1, the multi-RAT capability negotiation process including:
    receiving an information on the second base station which exists in the coverage of the first base station from the first base station;
    sending a multi-RAT capability request message including the information related to the second base station supporting $2^{nd}$ radio access technology based on the received information on the second base station to the first base station; and
    receiving a multi-RAT capability response message in response to the multi-RAT capability request message from the first base station.

5. The method of claim 4, wherein the multi-RAT capability response message comprises an information on a candidate second base station accessible by the mobile station.

6. The method of claim 1, wherein the $1^{st}$ radio access technology comprises a wideband radio access technology and wherein the $2^{nd}$ radio access technology comprises a short-range radio access technology.

7. The method of claim 1, wherein the first base station and the second base station are connected with each other by wired or wireless.

8. The method of claim 1, wherein a type of data flow transceived via the second base station is determined by an indication of the first base station.

9. A mobile station, which transceives data with a first base station supporting a $1^{st}$ radio access technology and a second base station supporting a $2^{nd}$ radio access technology in a radio access system supporting a multi-radio access technology (RAT), comprising:
    a wireless communication unit configured to externally transmit/receive a wireless signal; and
    a control unit connected to the wireless communication unit, the control unit controlling the wireless communication unit to transmit an indicator indicating the mobile station having a multi-RAT capability during network entry process with the first base station and receive, from the first base station, an information notifying that a multi-RAT capability negotiation process is performed after a completion of the network entry process, the control unit controlling the wireless communication unit to perform an multi-RAT capability negotiation process with the first base station to exchange an information necessary for an additional access to the second base station if the network entry process is an initial entry process to the first base station, the control unit controlling the wireless communication unit to perform a scanning process for at least one second base station included in a coverage of the first base station based on the exchanged information received from the first base station via the multi-RAT capability negotiation process, the control unit controlling the wireless communication unit to perform an additional access procedure with a second base station of the at least one second base station, the control unit controlling the wireless communication unit to simultaneously transceive data with the first base station and the second base station accessed by the additional access procedure, wherein if the network entry process is an re-entry process to the first base station prior to expiration of a predetermined timer, the multi-RAT capability negotiation process is omitted and the exchanged information is used for the re-entry process.

10. The mobile station of claim 9, wherein the control unit further controls the wireless communication unit to receive the information on the second base station existed in the coverage of the first base station from the first base station, the control unit controlling the wireless communication unit to send a multi-RAT capability request message including the information related to the second base station supporting $2^{nd}$ radio access technology based on the received information on the second base station to the first base station, the control unit controlling the wireless communication unit to receive a multi-RAT capability response message in response to the multi-RAT capability request message from the first base station.

* * * * *